(12) United States Patent
Fricker

(10) Patent No.: US 8,659,247 B2
(45) Date of Patent: Feb. 25, 2014

(54) CONTROL DEVICE AND METHOD FOR CONTROLLING AN ELECTRONICALLY COMMUTATED MOTOR, AND MOTOR

(75) Inventor: David Fricker, Oberhoffen sur Moder (FR)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 13/125,635

(22) PCT Filed: Oct. 13, 2009

(86) PCT No.: PCT/EP2009/063306
§ 371 (c)(1),
(2), (4) Date: Jul. 25, 2011

(87) PCT Pub. No.: WO2010/046269
PCT Pub. Date: Apr. 29, 2010

(65) Prior Publication Data
US 2011/0273119 A1 Nov. 10, 2011

(30) Foreign Application Priority Data
Oct. 23, 2008 (DE) .......................... 10 2008 043 117

(51) Int. Cl.
*H02P 6/16* (2006.01)
*H02P 6/06* (2006.01)

(52) U.S. Cl.
CPC ........................................ *H02P 6/06* (2013.01)
USPC .................. 318/400.04; 318/400.01; 318/700

(58) Field of Classification Search
CPC ........................................................ H02P 6/16
USPC ................................ 318/400.04, 400.01, 700
See application file for complete search history.

(56) References Cited

U.S. PATENT DOCUMENTS

| | | | | |
|---|---|---|---|---|
| 4,678,974 A | * | 7/1987 | Guastadini | 318/400.4 |
| 5,012,166 A | * | 4/1991 | Ushijima et al. | 318/400.13 |
| 5,350,987 A | * | 9/1994 | Ueki | 318/466 |
| 6,888,331 B2 | | 5/2005 | Serrano | |
| 7,034,490 B2 | * | 4/2006 | Sawtell et al. | 318/569 |
| 7,064,538 B2 | | 6/2006 | Kernhof | |
| 7,492,113 B2 | | 2/2009 | Maeda | |

FOREIGN PATENT DOCUMENTS

| | | |
|---|---|---|
| DE | 10359713 | 7/2004 |
| JP | H05344780 | 12/1993 |
| JP | 2003224991 A | 8/2003 |
| JP | 2005287187 | 10/2005 |

* cited by examiner

*Primary Examiner* — Bentsu Ro
*Assistant Examiner* — David Luo
(74) *Attorney, Agent, or Firm* — Michael Best & Friedrich LLP

(57) ABSTRACT

A control device for controlling an electronically commutated motor. The control device includes a control input for a rotor position signal and a control output for connection to field coils of the motor, and generates a load current for displacing a rotor of the motor depending on the rotor position signal outputting said load current via the control output. The control device includes at least one semiconductor switch for switching the load current depending on a semiconductor control signal, and includes at least one pulse generator which generates the load current in the form of a pulsed control signal for displacing the rotor. The control device also includes a delta sigma converter which is at least indirectly connected to the control input on the input side and which is designed to produce the semiconductor control signal in the form of a digital bit stream depending on the rotor position signal.

10 Claims, 4 Drawing Sheets

CONTROL DEVICE AND METHOD FOR CONTROLLING AN ELECTRONICALLY COMMUTATED MOTOR, AND MOTOR

BACKGROUND OF THE INVENTION

The invention relates to a control device for controlling an electronically commutated motor. The control device has a control input for a rotor position signal and a control output for connection to field coils of the motor, the rotor position signal representing a rotor position of a rotor of the motor. The control device is designed to generate a load current, in particular a torque, for moving the rotor on the basis of the rotor position signal and to output said load current via the control output. The control device has at least one semiconductor switch which is connected to the control output and is designed to switch the load current for moving the rotor on the basis of a semiconductor control signal.

DE 103 59 71 33 A1 discloses a rotor position sensor arrangement and a method for detecting a rotor position, in which a ferromagnetic rotor of a motor has sensor magnets for generating a rotor signal. The rotor position sensor arrangement also has a rotor position evaluation device which is designed to generate a rotor position signal which represents a digital value with a resolution of at least 2 bits. The rotor position evaluation device also has an analog/digital converter with a resolution of at least 2 bits.

SUMMARY OF THE INVENTION

The control device according to the invention has the features of the control device of the type mentioned at the outset, the control device, in particular the pulse generator, having a delta sigma converter. The delta sigma converter is at least indirectly connected, on the input side, to the control input and is designed to generate the semiconductor control signal in the form of a digital bit stream on the basis of the rotor position signal. This advantageously makes it possible for the load current to be formed as a pulsed control signal, in particular as a pulsed load current, which represents the bit stream.

As a result of the delta sigma converter, the control signal can be advantageously generated with a high resolution by the delta sigma converter. Furthermore, the semiconductor control signal can be advantageously generated with a high signal-to-noise ratio, for example with 60-fold oversampling. Furthermore, the delta sigma converter can be advantageously used to process the rotor position signal with a high degree of accuracy in order to generate the control signal for moving the rotor.

The at least one semiconductor switch is preferably in the form of a transistor in a transistor half bridge or full bridge. The semiconductor control signal for this embodiment is also referred to as a transistor control signal below. The transistors may each be in the form of a MOS-FET (MOS-FET=Metal Oxide Semiconductor Field Effect Transistor), a MIS-FET (MIS=Metal Insulator Semiconductor), a bipolar transistor, a JFET (JFET=Junction FET), an IGBT (IGBT=Insulated Gate Bipolar Transistor), an HEMT (HEMT=High Electron Mobility Transistor), an HBT (HBT=Heterojunction Bipolar Transistor) or the like, for example.

In another embodiment, the at least one semiconductor switch may also be in the form of a thyristor or a triac, for example, which switches the load current on the basis of the semiconductor control signal.

The control device preferably has at least one pulse generator which comprises the at least one semiconductor switch and is operatively connected, on the input side, to the control input and is connected, on the output side, to the control output. The pulse generator is designed to generate the load current for moving the rotor in the form of a pulsed control signal such that the pulsed control signal has temporally successive pulses with a respective control pulse duration and also preferably pulse pauses with a respective pulse pause duration.

The delta sigma converter is implemented, for example, by a DSP (DSP=Digital Signal Processor), an FPGA (FPGA=Field Programmable Gate Array), a microprocessor, in particular in conjunction with a program stored on a computer program product, or by a microcontroller.

In one advantageous embodiment of the control device, the delta sigma converter has a noise generator, in particular a digital noise generator, which is designed to generate the digital bit stream by superimposing noise, in particular by means of quantization and discretization.

The noise generator is preferably formed by virtue of the fact that the delta sigma converter does not have a low-pass filter on the output side. A low-pass filter on the output side is advantageously preferably formed by a load which is connected to the pulse generator on the output side and has an impedance with a low-pass characteristic. The load is also preferably formed by the field coils. This advantageously makes it possible to increase a pulse repetition frequency bandwidth of the control signal in comparison with a frequency bandwidth of the rotor position signal received on the input side.

For example, the delta sigma converter has an IIR filter (IIR=Infinite Impulse Response). The noise generator preferably has a predetermined noise power which is determined by an order of the IIR filter. The IIR filter may be formed as a second-order filter or as a filter with an order greater than the second order. This advantageously makes it possible to set a noise power of the noise generator on the basis of the order.

The noise generator is preferably designed to superimpose white noise, in particular, on a rotor control signal which is received on the input side and was generated on the basis of the rotor position signal. In another embodiment, the noise generator may be designed to superimpose colored noise, in particular pink noise, on the rotor control signal which is received on the input side and was generated on the basis of the rotor position signal. As a result of the superimposition of pink noise, low frequencies in comparison with high frequencies of the pink noise advantageously have a higher energy density than the high frequencies. The noise generator advantageously causes the frequency bandwidth of the rotor position signal received on the input side and/or of the rotor control signal to be wider than that without a noise generator. As a result, interference power in the control signal is advantageously distributed to frequencies which are different from one another and a better control signal, in terms of electromagnetic compatibility, than with conventional pulse width modulation is thus generated overall as the end result.

The control device preferably has a rotor control unit which is designed to generate the rotor control signal—in particular in the form of an analog voltage signal—on the basis of the rotor position signal. The pulse generator is preferably designed to use the rotor position signal to generate a discrete pulsed control signal representing the bit stream.

In one preferred embodiment, the control device has a subtraction element which is operatively connected to the control input on the input side. The subtraction element is connected to a voltage feedback means. The voltage feedback means connects a load branch of the semiconductor switch, in particular of the transistor half bridge or full bridge, to the subtraction element and is designed to feed back a voltage from the load circuit to the subtraction element, thus forming a control element, in particular comprising the voltage feedback means and the subtraction element. The control element is designed to compensate for a supply voltage fluctuation at least partially or completely. As a result of the control element, the control signal for driving the field coils of the motor may advantageously not have the supply voltage fluctuation or may only partially have the supply voltage fluctuation.

In one preferred embodiment, the voltage feedback means has a voltage divider which is connected to the control output and to a ground connection. A dividing connection of the voltage divider is connected to the subtraction element. The voltage divider may thus feed back a potential generated between the ground connection and the control output using voltage division to the subtraction element. The voltage feedback means formed in this manner advantageously makes it possible to feed back a supply voltage fluctuation, which would be present in the output signal without the voltage feedback means, to the subtraction element and thus to advantageously compensate for said fluctuation at least partially or completely.

In one preferred embodiment, the control element has an analog/digital converter which is connected to the load branch on the input side, the analog/digital converter being at least indirectly connected to the subtraction element on the output side and being designed to generate a bit stream which represents a supply voltage of the control device. The digital voltage feedback means formed in this manner advantageously makes it possible to calculate a value of the supply voltage at the input of the delta sigma converter by means of subtraction.

In one advantageous embodiment, the control element has a digital/digital converter which is connected to the analog/digital converter on the output side, the digital/digital converter being connected, on the output side, to the subtraction element and being connected, on the input side, to the analog/digital converter. The digital/digital converter is preferably a 1-bit digital/digital converter. The digital/digital converter preferably has a control input which is connected to the digital bit stream generated by the delta sigma converter. If there is a logic "one" of the bit stream at the control input, the digital/digital converter is designed to digitally convert a digital signal from the analog/digital converter that is received at the signal input and to output a conversion result or a previously generated conversion result on the output side. If a signal which represents a logic "zero" of the bit stream is received at the control input on the input side, the digital/digital converter is designed to generate an output signal which corresponds to the logic "zero" or to generate no output signal. The digital/digital converter advantageously makes it possible to precisely compensate for a supply voltage fluctuation.

The invention also relates to a motor having a control device of the type described above. The motor has a rotor in the form of a permanent magnet and a stator with at least two field coils. The field coils are connected to the control output of the control device.

In one preferred embodiment, the stator of the motor has three field coils, and the control device has a 3H or B6 bridge consisting of a plurality of semiconductor switches in order to drive the field coils, the semiconductor switches preferably being in the form of transistors. In this context, the B6 bridge consists of three transistor half bridges and the 3H bridge consists of three transistor full bridges or six transistor half bridges. In the case of an H bridge, a first connection of a field coil is connected to an output of one transistor half bridge and another connection of the field coil is connected to an output of a second transistor half bridge. In the case of a B6 bridge, an output of one transistor half bridge is connected to one connection of a field coil, and a second connection of the field coil is connected—depending on the connection of the field coils—to the second connections of the other field coils in the case of a star connection and to a first connection of another field coil in the case of a delta connection.

The motor having the control device described above advantageously has a noise generation and/or emission spectrum which, in the case of a corresponding design of the delta sigma converter, has a frequency distribution which is psychoacoustically favorable for human hearing and in which, for example, frequency components of the noise generation spectrum are outside a frequency range that can be perceived by a human ear and/or are distributed, in terms of energy, over a frequency range in such a manner that tonal components of the noise generation spectrum advantageously cause less interference.

For example, a sampling frequency of the delta sigma converter is twenty times, preferably 50 times or 100 times a rotor rotational frequency of the rotor.

The invention also relates to a method for generating a torque using a rotor of an electronically commutated motor. In the method, a control signal for moving the rotor is generated on the basis of a rotor position signal representing a rotor position of the rotor, the control signal having control pulses and pulse pauses. The control signal is preferably generated using delta sigma conversion.

In one preferred embodiment of the method, a pulse repetition frequency bandwidth of the control signal is increased in comparison with a frequency bandwidth of the rotor position signal received on the input side. As a result, a noise emission spectrum of an electronically commutated motor operated using the method can be advantageously configured in a psychoacoustically favorable manner.

In a further preferred embodiment of the method, the rotor of the electronically commutated motor is moved using the pulsed control signal and a torque is thus generated, in particular.

BRIEF DESCRIPTION OF THE DRAWINGS

The invention is now explained below using further advantageous exemplary embodiments and using figures.

DETAILED DESCRIPTION

Figure 1:
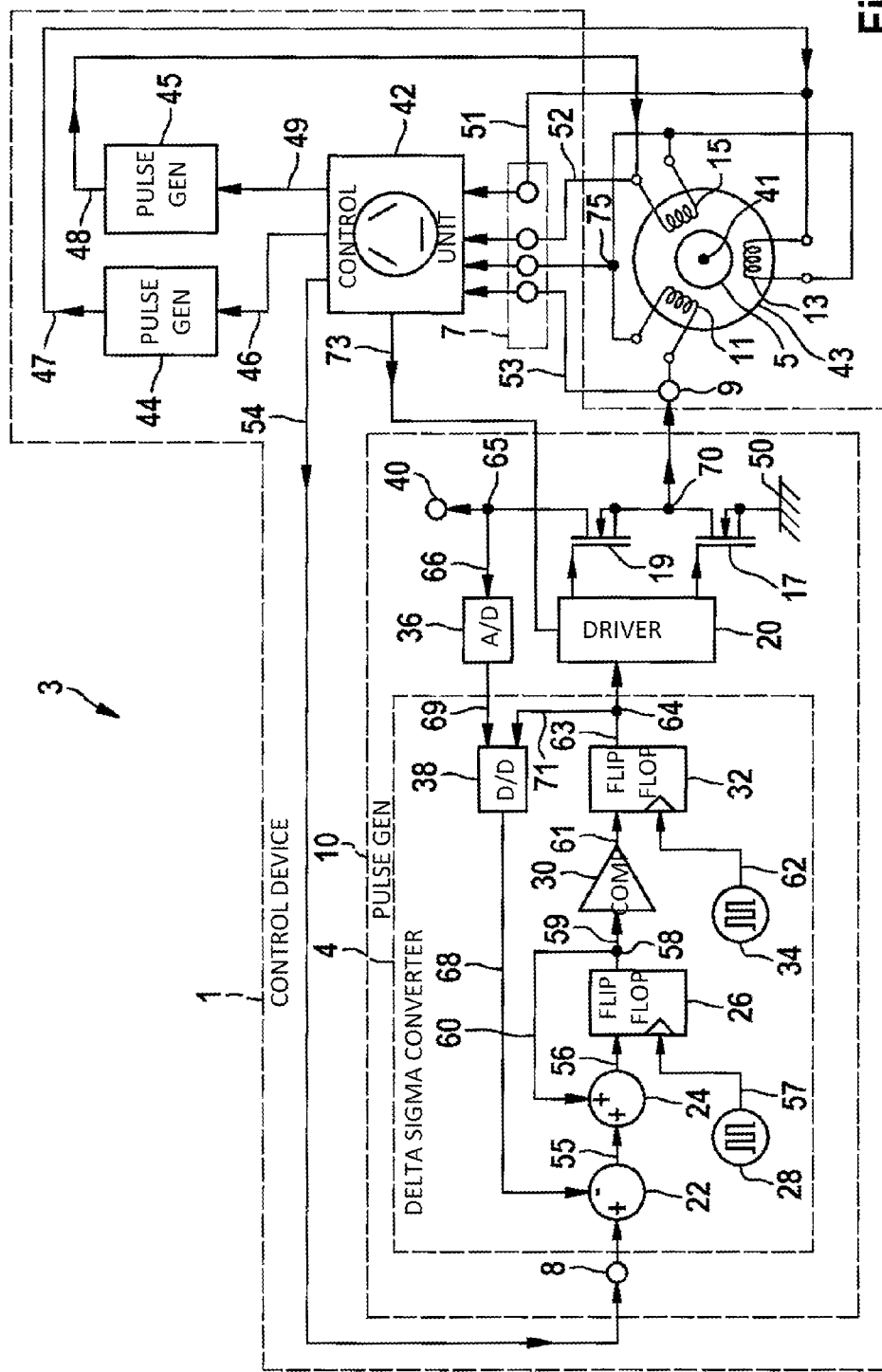
FIG. 1 schematically shows an exemplary embodiment of an electronically commutated motor having a control device with a delta sigma converter.

FIG. 1 schematically shows an exemplary embodiment of an electronically commutated motor 3 having a control device 1. The motor 3 has a rotor 5 which is rotatably mounted around a shaft 41. The control device 1 has a control input 7 and a control output 9. The control device 1 also has a pulse generator 10 having an input 8 for a rotor control signal. The pulse generator 10 is connected, on the output side, to the control output 9. The control output 9 of the control device 1 is connected to a connection of a field coil 11. In addition to the field coil 11, the motor 3 has a field coil 13 and a field coil 15 which, respectively held by a stator 43, are each arranged at an angle of 120° in the circumferential direction of the rotor 5 at a predetermined radial distance from the shaft 41. The control unit 1 is associated with the field coil 11, a pulse generator 44 of the motor 3 is associated with the field coil 13 and a pulse generator 45 of the motor 3 is associated with the field coil 15. The pulse generators 44 and 45 are each designed like the pulse generator 10.

The control device 1 has a subtraction element 22, a positive input of which is connected, on the input side, to the input 8 of the pulse generator 10 and is operatively connected to the control input 7 via a control unit 42. The subtraction element 22 is connected, on the output side, to an adding element 24 via a connecting line 55. The subtraction element 22 also has a negative input which is connected to a connecting line 68. The subtraction element 22 is designed to subtract a signal received at the negative input from a signal received at the positive input and to generate a subtraction result and output the latter on the output side.

The adding element 24 is connected, on the output side, to a flip-flop 26 via a connecting line 56. The flip-flop 26 is connected, on the input side, to a clock generator 28 via a connecting line 57. The flip-flop 26 is connected, on the output side, to a positive input of the adding element 24 via a connecting node 58 and a connecting line 60. The connecting line 60 forms a feedback loop. The flip-flop 26 thus forms an integrator together with the adding element 24. The flip-flop 26 is connected, on the output side, to a comparator 30 via the connecting node 58 and a connecting line 59. The comparator 30 is designed to evaluate a most significant bit (MSB) of a signal received on the input side and to generate an output signal representing the most significant bit (MSB).

The comparator 30 is connected, on the output side, to a flip-flop 32 which is in the form of a 1-bit memory in this embodiment. The flip-flop 32 is connected, on the input side, to a clock generator 34 via a connecting line 62. The clock generator 34 and the clock generator 28 are each formed by an oscillating crystal, for example. The flip-flop 32 and the comparator 30 together form a noise generator. The noise generator is used to superimpose noise on the signal generated by the integrator. The flip-flop 32 is connected, on the output side, to a connecting node 64 and to a gate driver 20 via a connecting line 63. The connecting node 64 is connected to a digital/digital converter 38 via a connecting line 71. The digital/digital converter 38 is connected, on the output side, to the negative input of the subtraction element 22 via a connecting line 68. The digital/digital converter 38 is connected, on the input side, to an analog/digital converter 36 via a connecting line 69. The subtraction element 22, the adding element 24, the flip-flop 26, the comparator 30, the flip-flop 32, the clock generators 28 and 34 and the digital/digital converter 38 together form a delta sigma converter 4. The flip-flop 32 of the delta sigma converter 4 generates a bit stream at the connecting node 64. The bit stream is transmitted to the digital/digital converter 38 via the connecting line 71. If a bit representing a logic "one" is received on the input side via the connecting line 71, the digital/digital converter 38 is designed to convert a signal, which is received on the input side via the connecting line 69, with quantization of one or more bits, in particular, and to generate an output signal which represents the signal received on the input side via the connecting line 69. The gate driver 20 is connected, on the input side, to the output of the flip-flop 32 via the connecting node 64 and the connecting line 63. The gate driver 20 is connected, on the output side, to a gate connection of a first semiconductor switch in the form of a transistor 19 in a transistor half bridge and a further output of the gate driver is connected to a gate connection of a second semiconductor switch in the form of a transistor 17 in the transistor half bridge. If a signal representing a logic "one" is received on the input side, the gate driver 20 is designed to drive the transistor 19 and, if a signal representing a logic "zero" is received the on the input side, the gate driver 20 is designed to drive the transistor 17. The transistors 17 and 19 in the transistor half bridge are each in the form of metal oxide semiconductor field effect transistors (MOS-FET), metal insulator semiconductor field effect transistors (MIS-FET) or the like, for example.

A source connection of the transistor 17 is connected to a ground connection 50 and a drain connection of the transistor 17 is connected to a connecting node 70. A source connection of the transistor 19 is connected to the connecting node 70 and a drain connection of the transistor 19 is connected to a connecting node 65. The connecting node 65 is connected to the analog/digital converter 36 via a connecting line 66. The connecting node 65 is also connected to a connection 40 for a voltage supply. The analog/digital converter 36 thus receives the voltage supply potential via the connecting line 66 and the connecting node 65. The output signal from the digital/digital converter 38 thus represents the supply voltage of the connection 40, which voltage is modulated by the bit stream at the connecting node 64.

The connecting node 70 is connected to the control output 9. The control output 9 thus receives—depending on which of the transistors 17 or 19 is driven—either the ground potential of the ground connection 50 or the potential of the connection 40. The control output 9 is connected to a first connection of the field coil 11 via a connecting line 53.

The motor 3 also has a rotor control unit 42. The rotor control unit 42 is connected, on the input side, to the control input 7. The control input 7 has connections for the field coils. The rotor control unit 42 is connected to the first connection of the field coil 11 via the control input 7 and a connecting line 53. The rotor control unit 42 is also connected, on the input side, to a first connection of the field coil 13 via the control input 7 and a connecting line 51 and is connected, on the input side, to a first connection of the field coil 15 via the control input 7 and a connecting line 52. The second connections of the field coils 11, 13 and 15 are each connected to one another and thus form a star connection 75 of a star circuit formed by the field coils 11, 13 and 15. The rotor control unit 42 is also connected, on the input side, to the star connection 75 via the control input 7. The rotor control unit 42 is connected, on the output side, to the pulse generator 44 via a connecting line 46, is connected, on the output side, to the pulse generator 45 via a connecting line 49 and is connected, on the output side, to the control input 7 of the control device 1 via a connecting line 54. The rotor control unit 42 is designed to generate the rotor control signal, in particular in the form of an analog signal, on the basis of a rotor position signal received on the input side—an induced voltage generated by a field coil in this exemplary embodiment—and to output said rotor control signal on the output side. For example, the rotor control unit 42 may transmit the rotor control signal to the pulse generator 44, 45 or to the pulse generator 10, on the basis of a signal amplitude and/or phase angle of an induction-generated voltage signal profile of the rotor position signal received at the input 7, in order to thus generate a rotating magnetic field using the rotor control signal and the field coils and in order to thus cause the rotor 5 to rotate about the shaft 41. The rotor control signals on the connecting lines 54, 46 and 49 are thus in a phase relationship which is produced by the rotor control unit and determines an angular velocity of the rotating magnetic field. Unlike in this exemplary embodiment, the rotor control unit 42 may be connected to Hall sensors, for example, the motor 3 then having a Hall sensor for each field coil in this exemplary embodiment, which Hall sensor is designed to detect a change in a magnetic field and to generate a Hall voltage corresponding to the change.

For example, the rotor control unit 42 can generate a control pulse using the pulse generator 44 and can transmit said control pulse to the field coil 13 via the connecting line 47. The rotor 5 can thus be caused to rotate in the clockwise direction, for example. The rotor control unit 42 can then generate a rotor control signal on the basis of an induced voltage signal which is received by the field coil 11 and/or by the field coil 15 and can transmit said rotor control signal to the input 8 of the pulse generator 10 via the connecting line 54. The delta sigma converter 4 can then convert the rotor control signal received at the input 8 into a bit stream. The delta sigma converter 4 is provided with feedback using a voltage feedback means formed by the digital/digital converter 38 and is designed to generate an output signal which forms the bit stream and can compensate for a supply voltage fluctuation received on the input side via the connecting lines 69 and 66.

The adding element 24 forms, together with the flip-flop 26, an integrator which is designed to add the signal received via the connecting line 55 and to transmit said signal to the comparator 30 via the connecting line 59. The comparator 30 is designed to generate an output signal if a signal received on the input side exceeds or undershoots a predetermined threshold value. In this exemplary embodiment, the comparator 30 is in the form of a digital threshold value switch. The comparator 30 can transmit the output signal generated using the threshold value method, via the connecting line 61, to the flip-flop 32 which forms a 1-bit memory in this exemplary embodiment. A bit stream whose bit repetition frequency is determined by the clock generator 34 is thus applied to the connecting node 64. The bit stream at the connecting node 64 forms the transistor control signal already mentioned. The bit stream at the output of the flip-flop 32, which is generated in this manner, has a larger frequency range than the rotor control signal received at the input 8 and is transmitted, on the output side, to the gate driver 20 via the connecting line 64. The rotor control unit 42 is connected to the gate driver 20 via a connecting line 73. In order to generate the rotating magnetic field, the rotor control unit 42 is designed to generate a disconnection signal which can be used to disconnect the gate driver, with the result that no gate is driven in the disconnected state.

The delta sigma converter 4 may also have an IIR filter, for example. The IIR filter is then arranged instead of the subtraction element 22 and the integrator formed by the adding element 24 and the flip-flop 26. Feedback for the IIR filter is then effected using the voltage feedback means formed by the connecting line 68 and the digital/digital converter 38.

Figure 2:
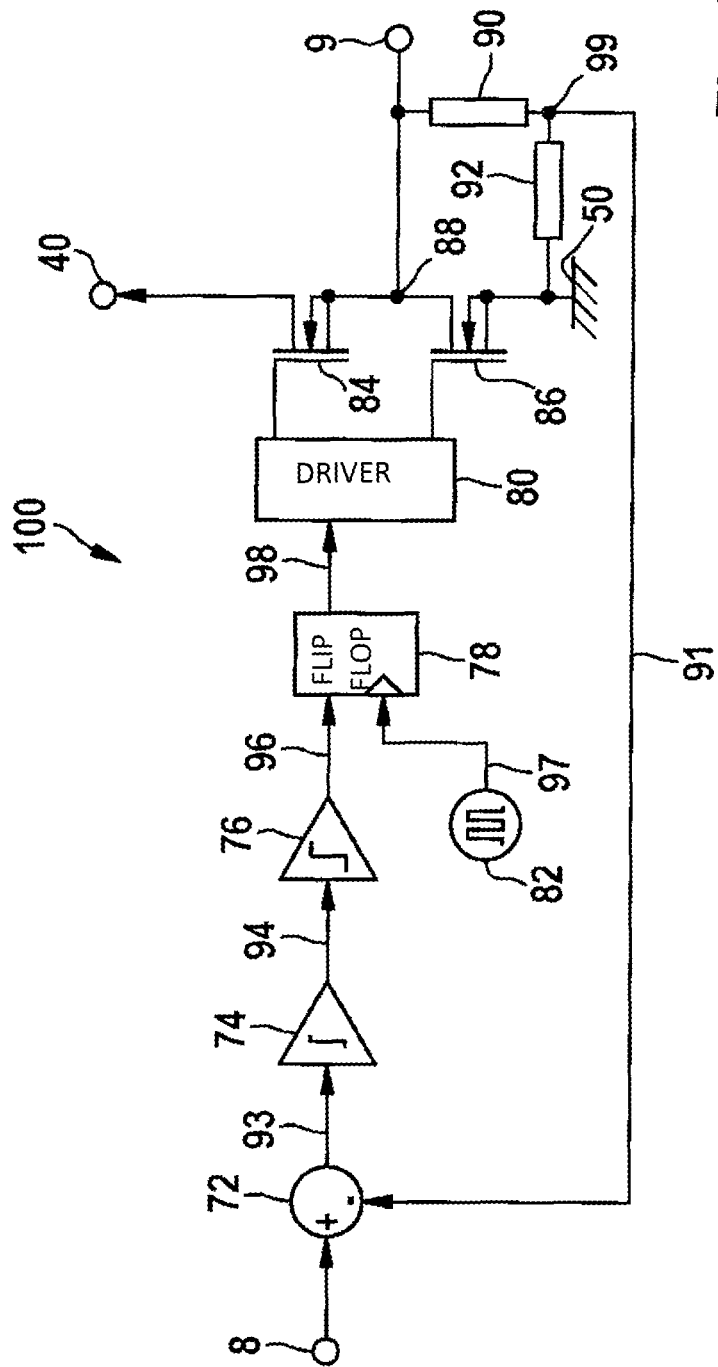
FIG. 2 schematically shows an exemplary embodiment of a control device for an electronically commutated motor with a delta sigma converter.

FIG. 2 shows an exemplary embodiment of a control device 100. The control device 100 has an input 8 for a rotor control signal, a control output 9 and a connection 40 for a supply voltage. The control device 100 may be part of the motor 3 illustrated in FIG. 1. Instead of the control device 1, the control device 100 can thus be connected, on the input side, to the connecting line 54 and can be connected, on the output side, to the connecting line 53 and to the supply voltage via the connection 40. The control device 100 has a delta sigma converter having analog components. The delta sigma converter has a subtraction element 72, a positive input of which is connected, on the input side, to the input 8. The subtraction element 72 is connected, on the output side, to an integrator 74 via a connecting line 93. On the output side, the integrator 74 is connected, via a connecting line 94, to a comparator 76 which is connected, on the output side, to a flip-flop 78 via a connecting line 96. The flip-flop 78 is connected, on the input side, to a clock generator 82 via a connecting line 97. On the output side, the flip-flop 78 is connected to a gate driver 80 via a connecting line 98. The gate driver 80 is connected, on the output side, to a gate connection of a first transistor 84 and is connected, on the output side, to a gate connection of a second transistor 86. The transistors 84 and 86 may each be in the form of a metal oxide semiconductor field effect transistor (MOS-FET) or a metal insulator semiconductor field effect transistor (MIS-FET) and together form a transistor half bridge. A source connection of the transistor 86 is connected to the ground potential 50 and a drain connection of the transistor 86 is connected to a source connection of the transistor 84 via a connecting node 88. A drain connection of the transistor 84 is connected to the connection 40 for a supply voltage. The connecting node 88 forms an output of the transistor half bridge and is connected to the control output 9.

The control device 100 also has a voltage feedback means for providing feedback for the delta sigma converter. The delta sigma converter is formed by the subtraction element 72, the integrator 74, the comparator 76 and the flip-flop 78. The voltage feedback means has a voltage divider which is formed by the resistors 90 and 92. A first connection of the resistor 90 is connected to the control output 9 and a second connection of the resistor 90 is connected to a dividing connection 99. A second connection of the resistor 92 is connected to the dividing connection 99 and a first connection of the resistor 92 is connected to the ground connection 50. The dividing connection 99 is connected to a negative input of the subtraction element 72 via a connecting line 91. The potential applied to the control output 9 is thus divided and is fed back to the subtraction element 72 in order to provide feedback for the delta sigma converter. A supply voltage fluctuation is at least partially reduced or completely eliminated in this manner during operation of the control device 100.

Figure 3:
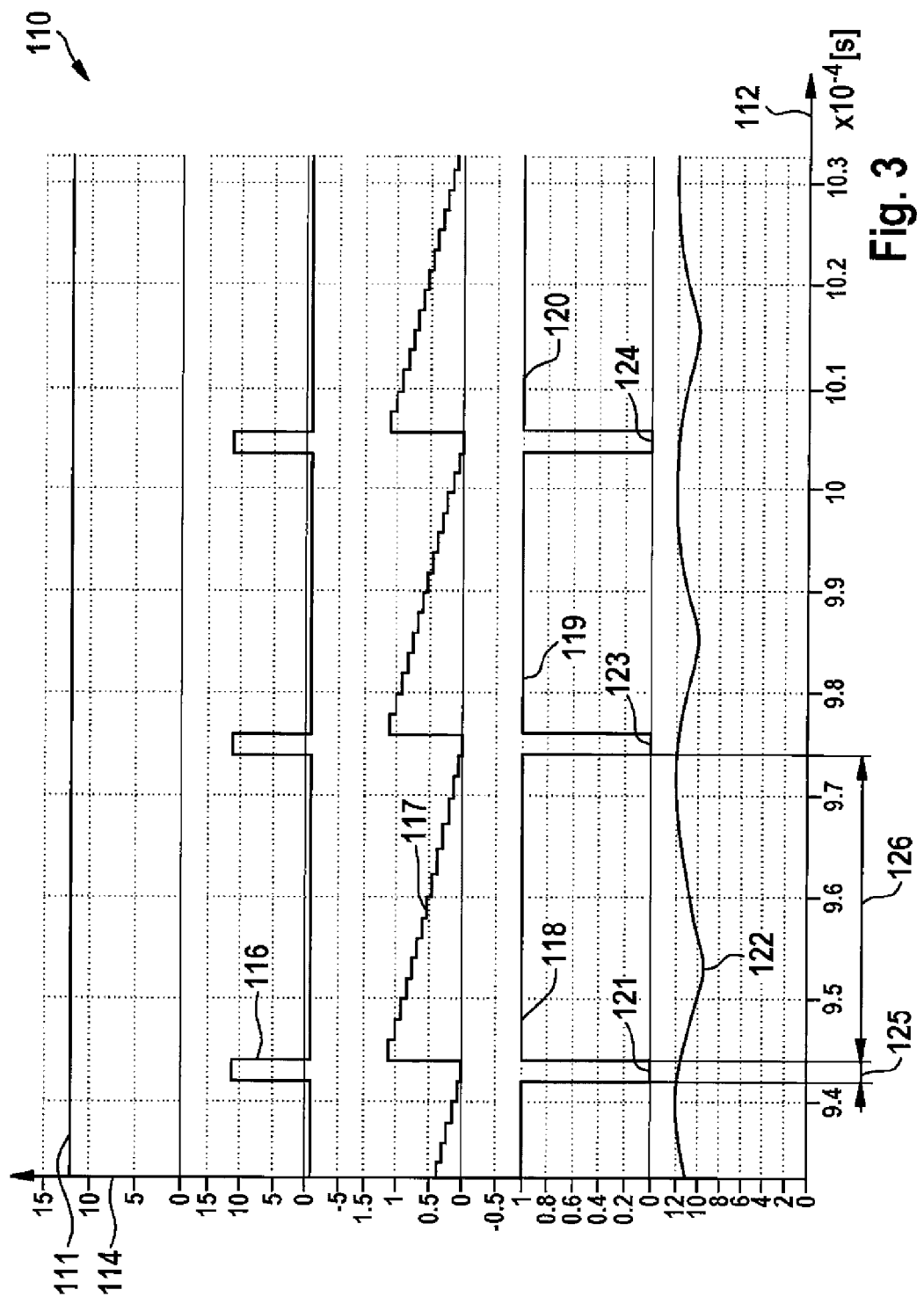
FIG. 3 shows an exemplary embodiment of signal sequences which are each detected at different locations of a signal path inside the control device.

FIG. 3 shows an exemplary embodiment of signals which have been generated by the control device 1 which is described in FIG. 1 and to which reference is also made below.

A graph 110 is illustrated. The graph 110 has an abscissa 112 and an ordinate 114. In the graph 110, a curve 111 shows a temporal profile of a supply voltage which is applied to the connection 40. The abscissa 112 represents a time axis. The times plotted there are indicated in $10^{-4}$ seconds. The curve 111 represents a temporal voltage profile, a voltage of the voltage profile being a constant 12 volts. The graph 110 also shows a curve 116. The curve 116 shows an exemplary signal profile at the output of the subtraction element 22, which profile has delta pulses which are successive periodically and in intervals of time. The graph 110 also shows a signal profile 117 which has sawtooth ramps which are successive periodically and in intervals of time. The signal profile 117 occurs, for example, as a response signal to the delta pulses of the signal 116 at the output of the flip-flop 26 and thus also at the connecting node 58. The comparator 30 thus receives the signal 117 on the input side. The signal 116 has a negative DC voltage component between the delta pulses. This gives rise to a signal profile of the signal 117 that falls in a stepped manner in the event of integration by the adding element 24 together with each clocked output of the flip-flop 26. In this case, each height of the steps corresponds to the negative DC voltage component of the signal 116 between the delta pulses.

The graph 110 also shows a digital bit stream. The digital bit stream forms the transistor control signal at the connecting node 64 and is used to drive the transistor half bridge via the gate driver 20. The digital bit stream comprises control pulses 118, 119 and 120. The control pulses 118, 119 and 120 each have a control pulse duration 126. In this exemplary embodiment, a pulse pause 121 having a pulse pause duration 125 precedes the control pulse 118. A pulse pause 123 precedes the control pulse 119 and a pulse pause 124 precedes the control pulse 120.

The graph 110 also shows a signal profile 122. The signal profile 122 represents an output signal from the control device 1 at the control output 9 with an inductive load of the field coils of the motor 3. The output signal which has an original signal profile corresponding to the bit stream is subjected to low-pass filtering by the field coils as an inductive load and thus gains the signal profile 122 as a result of low-pass filtering.

Figure 4:
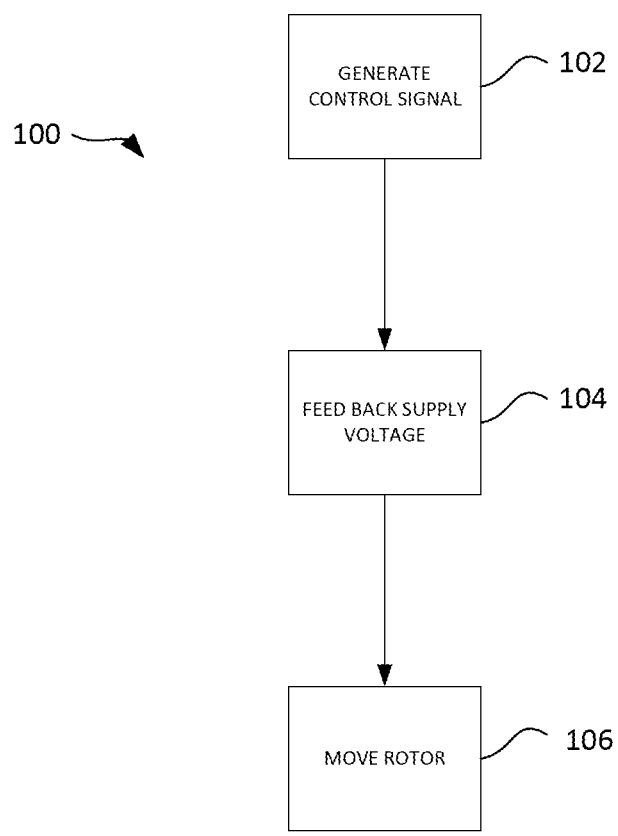
FIG. 4 schematically shows an exemplary embodiment of a method for controlling an electronically commutated motor.

FIG. 4 shows an exemplary embodiment of a method for generating a load current for generating a torque using a rotor of an electronically commutated motor. In the method, a control signal for moving the rotor is generated in a first step on the basis of a rotor position signal representing a rotor position of the rotor. The control signal is generated using delta sigma conversion and has control pulses and pulse pauses. In another method step 104, a supply voltage is fed back, via a voltage feedback means, to an input of the delta sigma converter and is subtracted there from the signal received on the input side by means of subtraction. In another method step 106, the rotor of the electronically commutated motor is moved using the load current and a torque is thus generated.

An exemplary sampling frequency of the delta sigma converter of the control device is between 10 times and 100 times the rotor rotational speed. The delta sigma converter thus operates with 10-fold to 100-fold oversampling. An exemplary pulse repetition frequency for driving the transistor half bridge is between 2 kilohertz and 1 megahertz, preferably 5 megahertz, particularly preferably 10 megahertz.

The invention claimed is:

1. A control device (1) for controlling an electronically commutated motor (3), the control device (1) having a control input (7) for receiving a rotor position signal representing a position of a rotor (5) of the motor (3) and a control output (9) for connection to field coils (11, 13, 15) of the motor (3), the control device (1) configured to generate a load current for moving the rotor (5) based on the rotor position signal, the load current provided via the control output (9), the control device (1) having at least one semiconductor switch (17, 19, 84, 86) connected to the control output (9), the semiconductor switch (17, 19, 84, 86) configured to switch a the load current for moving the rotor (5) based on a semiconductor control signal, and the control device (1) having at least one pulse generator (10, 44, 45) with an input side connected to the control input (7) and an output side connected to the control output (9), the at least one pulse generator (10, 44, 45) including the at least one semiconductor switch (17, 19, 84, 86) the pulse generator (10, 44, 45) configured to generate the load current for moving the rotor (5) in the form of a pulsed control signal such that the pulsed control signal has temporally successive control pulses (118, 119, 120) with a control pulse duration (126), characterized in that the pulse generator (10, 44, 45) has a delta sigma converter (4), an input side of the delta sigma converter (4) being operatively connected, to the control input (7) and configured to generate the semiconductor control signal in the form of a digital bit stream on the basis of the rotor position signal.

2. The control device (1) as claimed in claim 1, characterized in that the delta sigma converter (4) has a noise generator (30, 32) configured to superimpose noise on a rotor control signal received on the input side (8) and is generated based on the rotor position signal and to generate the digital bit stream in such that a pulse repetition frequency bandwidth of the rotor control signal is wider than a frequency bandwidth of the rotor position signal.

3. The control device (1) as claimed in claim 1, characterized in that the control device (1) has a subtraction element (22, 72) which has an input side connected to the control input (7) and is connected to a voltage feedback means (36, 38, 68), the voltage feedback means (36, 38, 68, 90, 92) connecting a load branch (65, 88) of the semiconductor switch to the subtraction element (22, 72) and configured to feed back a voltage (40, 99) from the load circuit (65, 88) to the subtraction element (22, 72), thus forming a control element (36, 38, 68, 90, 92, 22, 72) which is designed to compensate for a supply voltage fluctuation.

4. The control device (1, 100) as claimed in claim 3, characterized in that the voltage feedback means (90, 92, 99, 91) has a voltage divider (90, 99) which is connected to the control output (9) and to a ground connection (50) and a dividing connection (99) which is connected to the subtraction element (72) and which is designed to feed back to the subtraction element (72) a potential generated between the ground connection (50) and the control output (9) using voltage division.

5. The control device (1) as claimed in claim 3, characterized in that the control element has an analog/digital converter (36) which is connected to the load branch on the input side, the analog/digital converter (36) being at least indirectly connected to the subtraction element (22) on the output side and being designed to generate a bit stream which represents a supply voltage (40) of the control device (1).

6. The control device (1) as claimed in claim 5, characterized in that the control element has a digital/digital converter (38) which is connected to an input side of the analog/digital converter (36), the digital/digital converter (38) having an output side connected to the subtraction element (22) and an input side connected to the analog/digital converter (36), the digital/digital converter having a control input which receives the digital bit stream generated by the delta sigma converter, the digital/digital converter configured to digitally convert a digital signal received from the analog/digital converter when the bit stream received at the control input is a logic "one," outputting a conversion result or a previously generated conversion result, and to generate an output signal which corresponds to a logic "zero" when the bit stream received at the control input is a logic "zero".

7. The motor (3) as claimed in claim 6, characterized in that the stator (43) of the motor has three field coils (11, 13, 15), and the control device (1, 100) has a 3H bridge or a B6 bridge, which comprises the semiconductor switches (17, 19, 84, 86), for driving the field coils.

8. A motor (3) having a control device (1, 100) as claimed in claim 1, the motor (3) having a rotor (5) in the form of a permanent magnet and a stator (43) with at least two field coils (11, 13, 15), the field coils (11, 13, 15) being connected to the control output (9) of the control device (1, 100).

9. A method for generating a torque using a rotor (5) of an electronically commutated motor (3), in which a pulsed control signal for moving the rotor (5) is generated on the basis of a rotor position signal representing a rotor position of the rotor (5), the control signal having control pulses (118, 119, 120) and pulse pauses (121, 123, 124), characterized in that the control signal is generated using delta sigma conversion, wherein a pulse repetition frequency bandwidth of the control signal is greater than a frequency bandwidth of the rotor position signal received on the input side.

10. The method as claimed in claim 9, in which the rotor (5) of the electronically commutated motor (3) is moved using the pulsed control signal.

\* \* \* \* \*

UNITED STATES PATENT AND TRADEMARK OFFICE
CERTIFICATE OF CORRECTION

PATENT NO. : 8,659,247 B2
APPLICATION NO. : 13/125635
DATED : February 25, 2014
INVENTOR(S) : David Fricker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 360 days.

Signed and Sealed this

Twenty-ninth Day of September, 2015

Michelle K. Lee
*Director of the United States Patent and Trademark Office*